(12) United States Patent
Reddy A V et al.

(10) Patent No.: US 10,929,311 B2
(45) Date of Patent: Feb. 23, 2021

(54) STREAM LEVEL UNINTERRUPTED BACKUP OPERATION USING DATA PROBE

(71) Applicant: EMC IP Holding Company LLC, Hopkinton, MA (US)

(72) Inventors: Mahesh Reddy A V, Bangalore (IN); Chetan Battal, Bangalore (IN); Mahantesh Ambaljeri, Bangaluru (IN); Swaroop Shankar DH, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/453,568

(22) Filed: Jun. 26, 2019

(65) Prior Publication Data

US 2020/0409866 A1    Dec. 31, 2020

(51) Int. Cl.
*G06F 12/0866*   (2016.01)
*G06F 12/0868*   (2016.01)
*G06F 12/12*     (2016.01)
*G06F 11/14*     (2006.01)
*G06F 12/0815*   (2016.01)
*G06F 16/903*    (2019.01)

(52) U.S. Cl.
CPC .......... *G06F 12/12* (2013.01); *G06F 11/1464* (2013.01); *G06F 11/1469* (2013.01); *G06F 12/0815* (2013.01); *G06F 12/0866* (2013.01); *G06F 12/0868* (2013.01); *G06F 16/903* (2019.01); *G06F 2212/28* (2013.01); *G06F 2212/31* (2013.01)

(58) Field of Classification Search
CPC ............ G06F 11/1464; G06F 12/0866; G06F 12/0868; G06F 2212/28; G06F 2212/31; G06F 2212/314; G06F 2212/46; G06F 2212/461; G06F 2212/462
See application file for complete search history.

(56) References Cited

U.S. PATENT DOCUMENTS

| | | | | |
|---|---|---|---|---|
| 4,831,516 A | * | 5/1989 | Tanaka | G06F 12/0653 379/165 |
| 8,924,355 B1 | * | 12/2014 | Kundzich | G06F 11/1448 707/647 |
| 8,943,282 B1 | * | 1/2015 | Armangau | G06F 16/128 711/162 |
| 9,112,525 B1 | | 8/2015 | Sjoholm et al. | |
| 9,645,888 B1 | * | 5/2017 | Panchanathan | G06F 11/1451 |
| 2012/0005165 A1 | | 1/2012 | Tsai | |

(Continued)

*Primary Examiner* — Tracy A Warren
(74) *Attorney, Agent, or Firm* — Womble Bond Dickinson (US) LLP

(57) ABSTRACT

Methods and systems for backing up data to a target device are described. According to some embodiments, the method receives a first set of data packets for backup, where the first set of data packets includes a multiplicity of data chunks. The method further captures footprints of the first set of data packets in a cache disk array. In response to receiving an acknowledgement from the cache disk array indicating the footprints have been captured, the method further initiates a write operation to write each data chunk of the first set of data packets to the target device. In response to receiving an acknowledgement indicating the data chunk is successfully written, the method further flushes the respective footprint of the data chunk from the cache disk array.

24 Claims, 9 Drawing Sheets

(56) References Cited

U.S. PATENT DOCUMENTS

| | | |
|---|---|---|
| 2013/0346521 A1 | 12/2013 | Arabo et al. |
| 2015/0220398 A1 | 8/2015 | Schirripa et al. |
| 2016/0004637 A1* | 1/2016 | Kimmel ............... G06F 3/0679 714/6.22 |
| 2018/0357019 A1 | 12/2018 | Karr et al. |
| 2019/0042375 A1 | 2/2019 | Bradshaw et al. |
| 2019/0129803 A1 | 5/2019 | Sakdeo et al. |
| 2019/0205227 A1 | 7/2019 | Setter et al. |

* cited by examiner

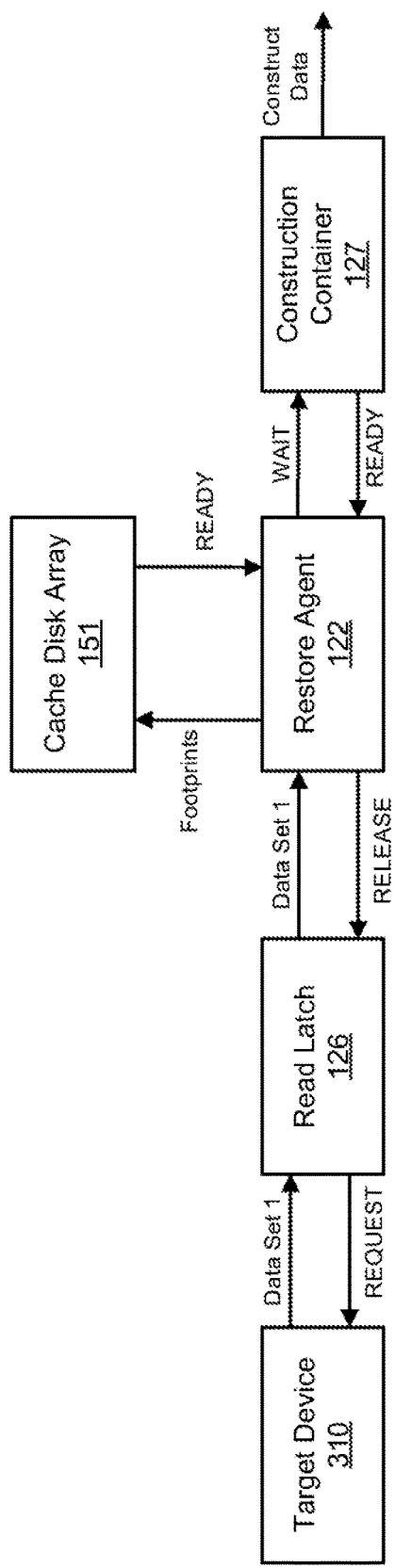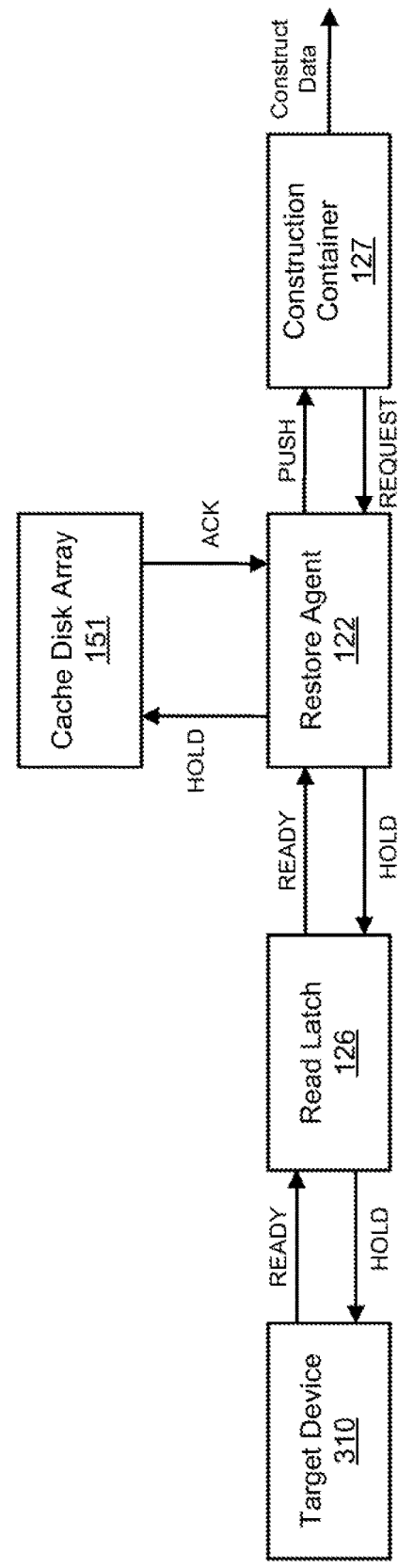

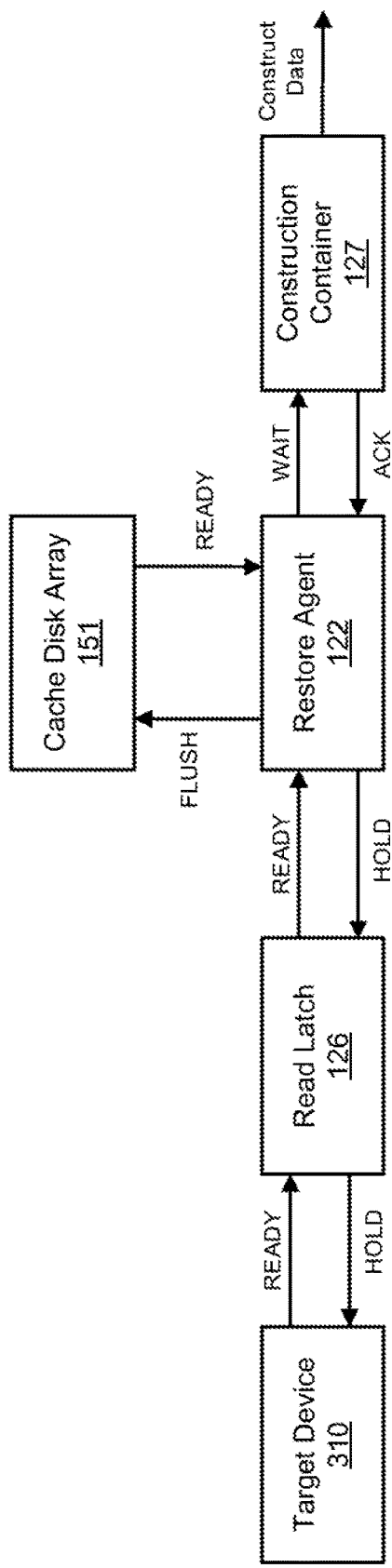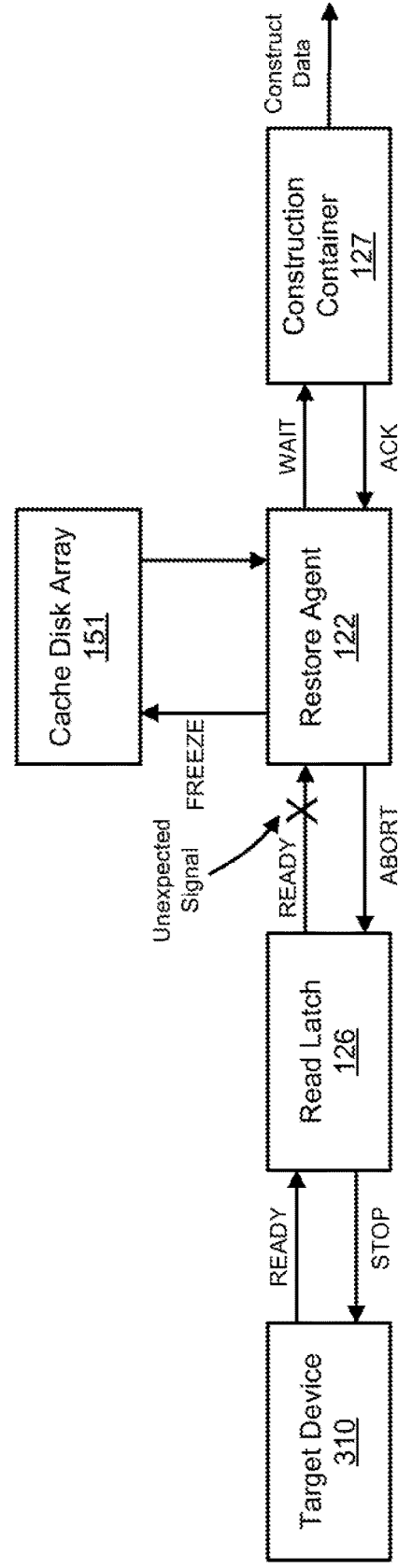

STREAM LEVEL UNINTERRUPTED BACKUP OPERATION USING DATA PROBE

RELATED APPLICATIONS

This application is related to co-pending U.S. patent application Ser. No. 16/453,674, entitled "Stream Level Uninterrupted Restore Operation Using Data Probe," filed Jun. 26, 2019, the disclosure of which is incorporated by reference herein in its entirety.

FIELD OF THE INVENTION

Embodiments of the present invention relate generally to data storage systems. More particularly, embodiments of the invention relate to stream level uninterrupted backup operation using a data probe approach.

BACKGROUND

Unexpected events can cause backup and/or restore operations to abort prior to the completion of such operations. The need to start successive backups (or restores) from the point of interruption to avoid an increase in backup or restore window has become vital nowadays. While the backup or restore operation is in progress and due to some random unintended event, the operation would abruptly abort, thereby causing data to be partially written (e.g., half written) back to the target device or host. Also, the backup or restore would be rolled back after this point in most of the cases resulting in unusable data and potentially corrupted production environment. Such situation would lead to an increase of backup or restore window. Additionally, other pain point is that the backup or restore must be restarted again from the beginning, even though there are some portions of backup or restore data that have been completed.

Apparently, the backup admin would need a backup application that provides a service-level agreement (SLA) of achieving any successive backup or restore from an improper or random or unintended abort to be continuous in nature. The aim of a backup admin during such scenarios would be to have the successive backup or restore to be started from the point of abort, without the necessity of having to restart from the beginning, and to avoid any further increase in the backup or restore window.

BRIEF DESCRIPTION OF THE DRAWINGS

Embodiments of the invention are illustrated by way of example and not limitation in the figures of the accompanying drawings in which like references indicate similar elements.

FIGS. 3A-3F are block diagrams illustrating a restore operation according to one embodiment.

DETAILED DESCRIPTION

Figure 1:
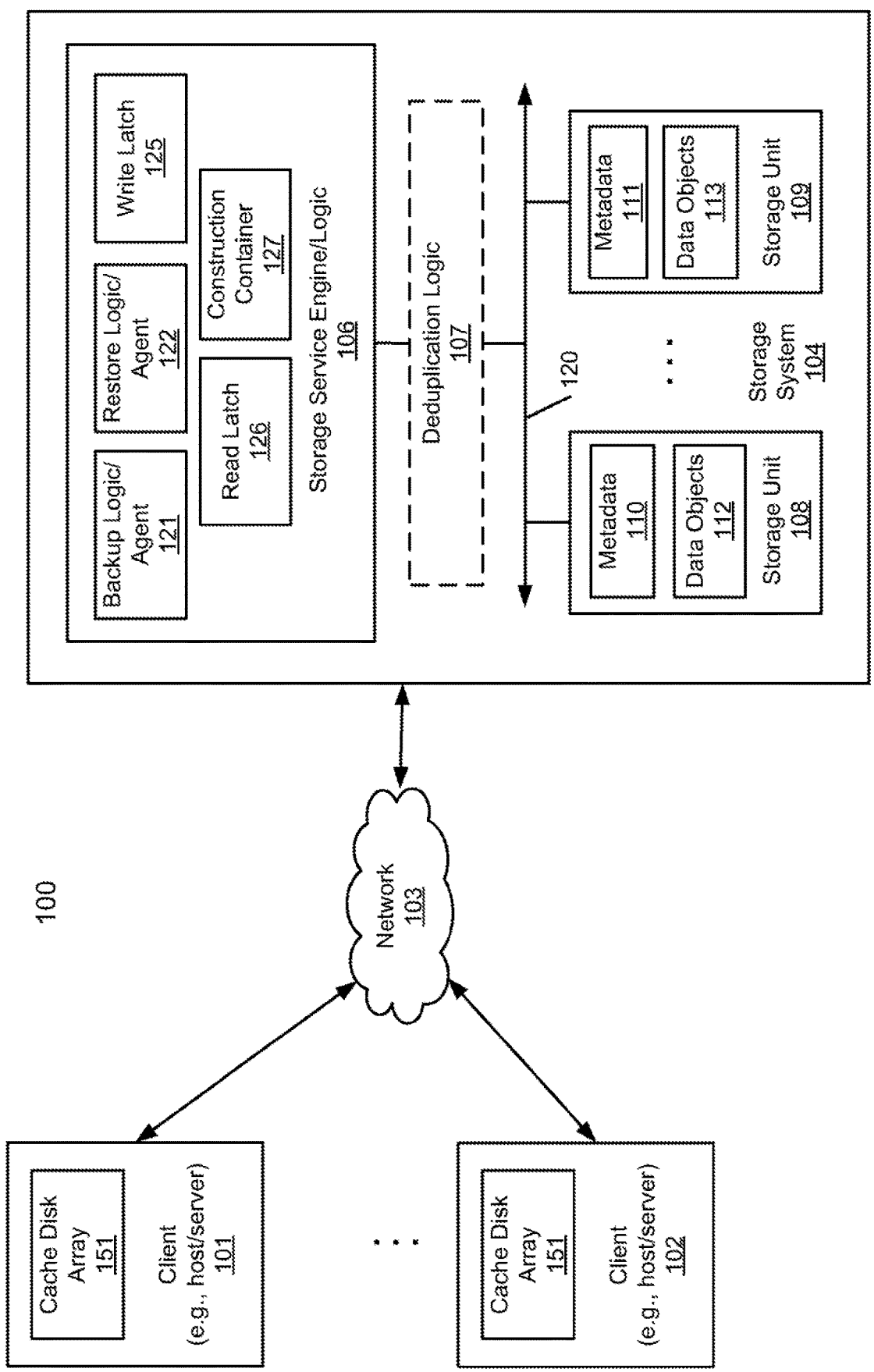
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention disclose how the data probe approach has been used to identify the abrupt abort during a backup operation, and ensure a safe uninterrupted backup from the aborted point in the next backup session. In one embodiment, a cache disk array is used to hold marginal footprints of the data to be write-latched for the backup operation at any instance of time. Backup agent may utilize these footprints after an aborted backup to understand the current set of data packets that has to be consumed for the immediate write operation resulting in an uninterrupted backup session.

Embodiments of the invention further disclose a solution to avoid an increase in the backup window due to an unexpected abort. The solution ensures an uninterrupted backup service after an unintended termination of the backup session.

Embodiments of the invention further disclose how the data probe approach has been used to identify the abrupt abort during a restore operation and ensure a safe uninterrupted restore from the aborted point in the next restore session. In one embodiment, a cache disk array is used to hold marginal footprints of the data to be constructed for the restore operation at any instant of time. Restore agent may utilize these footprints after an aborted restore to understand the current set of data packets that has to be consumed for the immediate read operation resulting in an uninterrupted restore session.

Embodiments of the invention further disclose a solution to avoid an increase in the restore window due to an unexpected abort. The solution also ensures an uninterrupted restore service after an unintended termination of the restore session to prevent a corrupted production data.

According to some embodiments, a method for backing up data to a target device is described. The method receives a first set of data packets for backup, where the first set of data packets includes a multiplicity of data chunks. The method further captures footprints of the first set of data packets in a cache disk array. In response to receiving an acknowledgement from the cache disk array indicating the footprints have been captured, the method further initiates a write operation to write each data chunk of the first set of data packets to the target device. In response to receiving an acknowledgement indicating the data chunk is successfully written, the method further flushes the respective footprint of the data chunk from the cache disk array.

According to another embodiment, a method for restoring data from a target device is described. The method receives a first set of data packets for restore, where the first set of data packets includes a multiplicity of data chunks. The method further captures footprints of the first set of data packets in a cache disk array. In response to receiving an acknowledgement from the cache disk array indicating the footprints of the first set of data packets have been captured, the method pushes each data chunk of the first set of data packets to a construction container for reconstruction of backup data. In response to receiving an acknowledgement from the construction container indicating the data chunk is successfully pushed, the method flushes the respective footprint of the data chunk from the cache disk array.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up data from a client (e.g., clients 101-102) and to store the backup data in any one or more of storage units 108-109. In one embodiment, the backup data may be loaded into write latch 125, and write latch 125 is configured to write the backup data to a target device (e.g., storage units 108-109). Restore logic or agent 122 is configured to retrieve and restore backup data from any one or more of storage units 108-109 back to a client (e.g., clients 101-102). In one embodiment, to restore the backup data, read latch 126 may read the data from a target device (e.g., storage units 108-109), where the data is loaded into read latch 126. In one embodiment, cache disk array 151 is an emulated disk array carved out from a source under backup and/or restore host. In FIG. 1, cache disk array 151 is installed on each of client 101-102, though cache disk array 151 may be installed on storage system 104. In one embodiment, cache disk array 151 may temporarily store marginal footprints of the backup data. Construction container 127 (e.g., conditional construction container) may receive restore backup data from restore agent 122 and construct the received backup data until the reconstruction is completed.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2A:
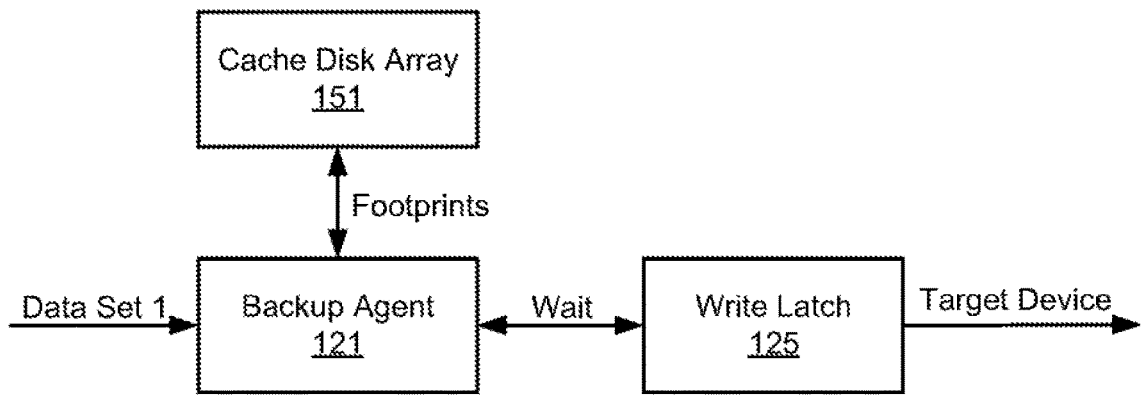
FIGS. 2A-2F are block diagrams illustrating a backup operation according to one embodiment.

FIGS. 2A-2F are block diagrams illustrating a backup operation according to one embodiment. Referring to FIGS. 2A-2F, backup agent 121 receives a set of data packets (referred to as "Data Set 1" in FIG. 2A) that needs to be write-latched for the write operation. In addition, marginal footprints associated with the set of data packets may be stored in cache disk array 151. As previously described, a cache disk array refers to an emulated disk array that is carved out from the source under backup. For example, if there are two servers that are being backed up, the cache availability may be noted and emulated for a generic cache disk array and utilized by the backup agent 121. The following chronology illustrates the solution step by step:

Referring to FIG. 2A, the first set of data packets ("Data Set 1") are received by backup agent 121. The marginal footprints of the first set of data packets are captured in cache disk array 151. The marginal footprints may include minimal data properties, such as last byte information, logical address on the storage, sector information, packet metadata information, etc. Concurrently, write latch 125 may be indicated by the backup agent 121 with a 'wait' signal to initiate the write operation.

Figure 2B:
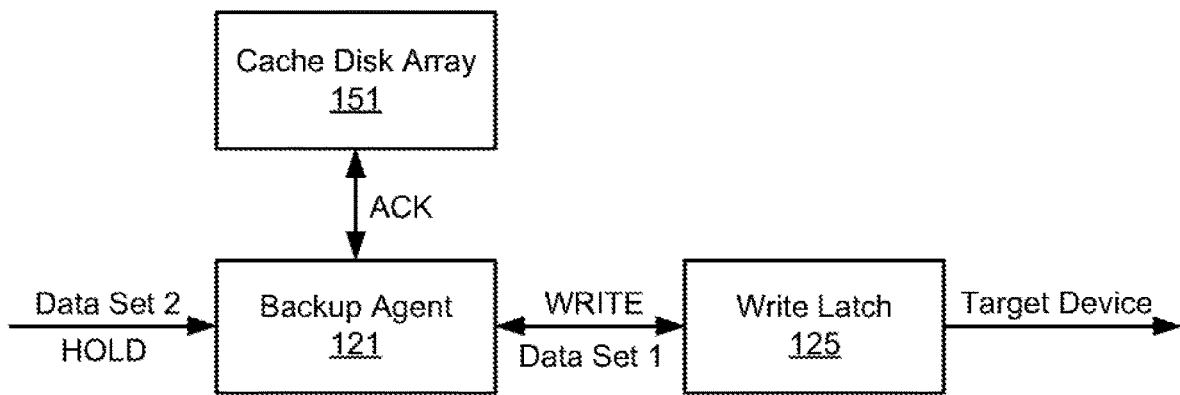

Referring to FIG. 2B, the cache disk array (CDA) 151 acknowledges (e.g., "ACK" signal) the capture of the footprints of Data Set 1 to the backup agent 121. Consequently, the backup agent 121 initiates a write operation to write latch 125 and loads Data Set 1 into write latch 125. At the same time, a second set of data packets ("Data Set 2") may be on a 'hold' state at backup agent 121.

Figure 2C:
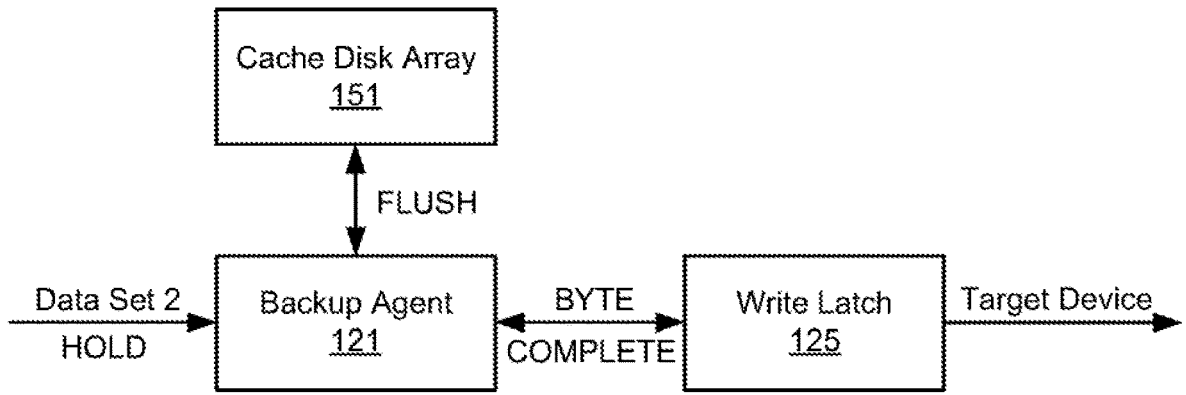

Referring to FIG. 2C, data chunks (e.g., byte-by-byte) from Data Set 1 is written successfully to a target device and acknowledged by write latch 125 to the backup agent 121. Subsequently, backup agent 121 may flush the respective footprint of each data chunk from CDA 151. This is to ensure that there is a regular track on the data chunks (e.g., bytes) transferred successfully to the target device. Once the data chunks are successfully written to the target device, the footprints from CDA 151 may be flushed by backup agent 121 to ensure the space for the next set of footprints.

Figure 2D:
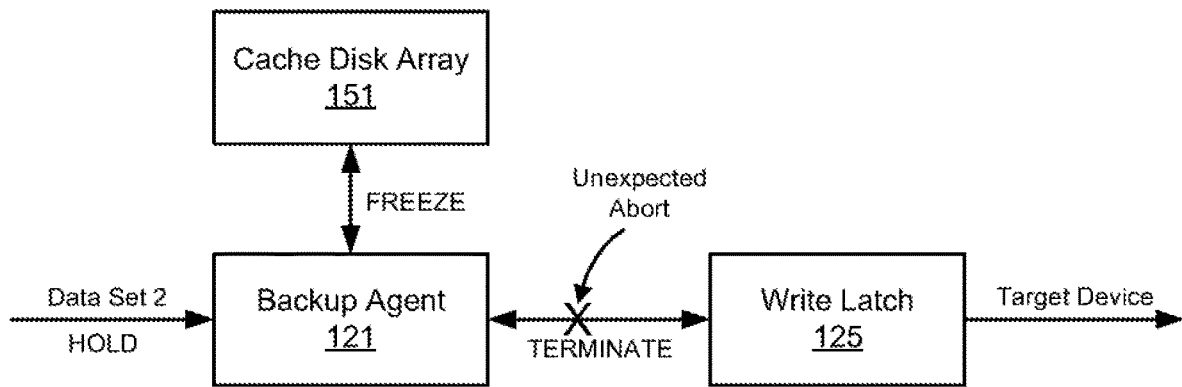

Referring to FIG. 2D, if the write operation is aborted, for example in response to an unexpected signal, backup agent 121 may freeze the CDA 151 (e.g., by communicating a 'FREEZE' signal) at the point in time where the last data chunk (e.g., last byte) was successfully written. In this way, the CDA 151 may be used as reference for the last data chunk that has been successfully transferred to the target device. Concurrently, the write latch 125 may be terminated and result in the final backup termination.

Figure 2E:
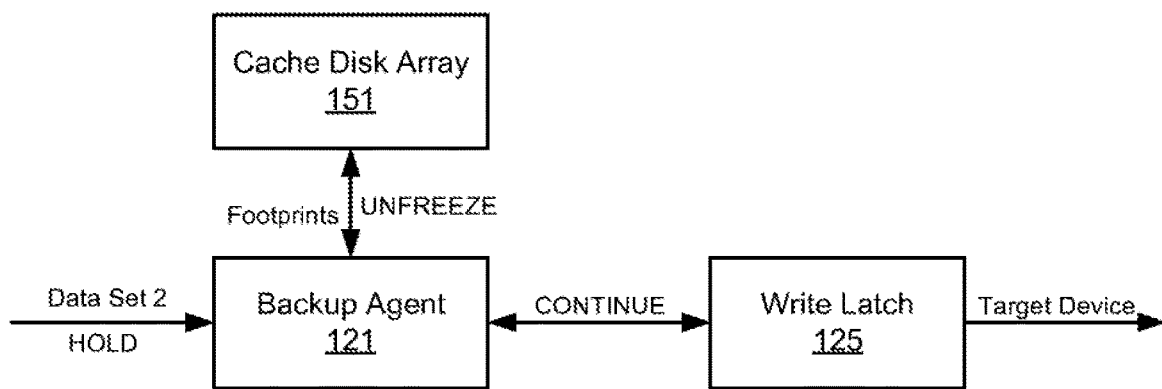

Referring to FIG. 2E, when the next backup is triggered, CDA 151 may initially be queried for the captured footprints (or remaining footprints as some may have been flushed), and the last data chunk that was transferred from the data set (e.g., Data Set 1) may be identified based on the footprints. From the marginal footprints captured in CDA 151, all of the information regarding the last data set that was transferred may be retrieved by the backup agent 121. The backup agent 121 may now retrieve the data set or data chunk that was to-be-written from the point in time where it was aborted. Accordingly, a start signal to the write latch 125 may be provided, and an 'Unfreeze' signal may be communicated to the CDA 151 to start the data tracking.

Figure 2F:
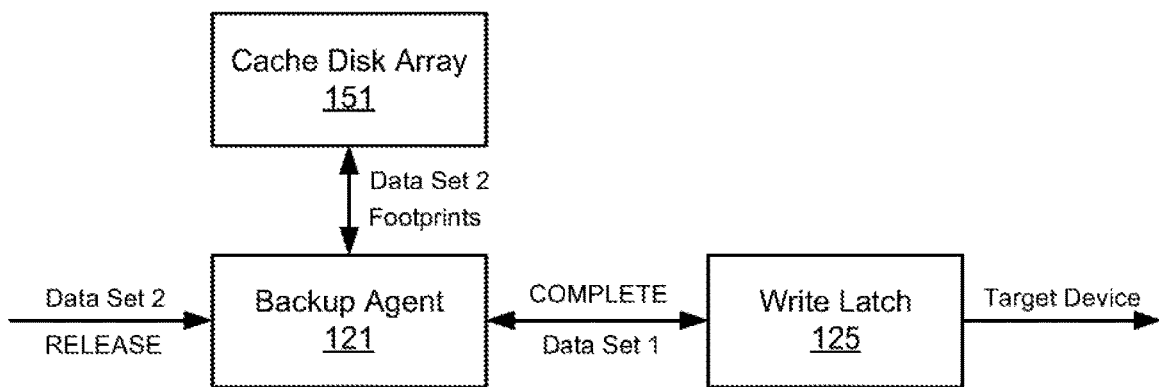

Referring to FIG. 2F, once the backup is completed, the next data set may be retrieved by the backup agent 121 with a 'release' signal to the agent input.

FIGS. 3A-3F are block diagrams illustrating a restore operation according to one embodiment. Referring to FIGS. 3A-3F, restore agent 122 receives a set of data packets (referred to as "Data Set 1" in FIG. 3A) that is read-latched for the reconstruction and storing of the marginal footprints in cache disk array 151. Here, cache disk array 151 may be referred to as an emulated disk array that is carved out from the restore host. Also, the restore agent 122 ensures that the set of data packets being read from target device 310 (e.g., storage units 108-109 of FIG. 1) may be routed to a construction container 127 (e.g., conditional construction container (CCC)) in order to make sure that the replay happens only after the last data chunk (e.g., last byte of data) has been successfully read from the target device. Following chronology illustrates the solution step by step:

Referring to FIG. 3A, a first set of data packets (Data Set 1) is received by the restore agent 122 from read latch 126. For example, restore agent 122 may communicate a 'release' signal to read latch 126. In turn, read latch 126 may communicate a 'request' signal to target device 310 to receive or retrieve the first set of data packets and provide the first set of data packets to restore agent 122. Marginal footprints of the first set of data packets are captured in cache disk array 151. Marginal footprints may include minimal data properties, such as last byte information, logical address on the storage, sector information, packet metadata information, etc. Concurrently, the read latch 126 may be indicated by restore agent 122 with a 'wait' signal to initiate a successive read operation. Container 127 may also receive a 'wait' signal from restore agent 122.

Referring to FIG. 3B, cache disk array 151 acknowledges the capture of the footprints of Data Set 1 to the restore agent 122. Consequently, the restore agent 122 initiates a 'PUSH' signal to container 127 to push Data Set 1 to container 127. At the same time, a second set of data packets is on a 'hold' state at the read latch 126 (as indicated by restore agent 122).

Referring to FIG. 3C, data chunks from Data Set 1 (e.g., byte-by-byte) are pushed successfully to container 127 and the pushed data chunks are acknowledged by the container 127. Consequently, the restore agent 122 may flush the respective footprint of each data chunk from cache disk array 151. This is to ensure that there is a regular track on the data chunks (e.g., bytes) pushed successfully to container 127. Once the data chunks are successfully pushed to container 127, the footprints from cache disk array 151 may be flushed by restore agent 122 to ensure the space for the next set of footprints.

Referring to FIG. 3D, if the read operation is aborted with an unexpected signal, the restore agent 122 may 'freeze' the cache disk array 151 at the point in time where the last data chunk (e.g., the last byte) was pushed successfully. In this way, cache disk array 151 is used as a reference for the last data chunk that has been successfully read and pushed to container 127. Concurrently, the read operation may be terminated and results in a final restore termination.

Figure 3E:
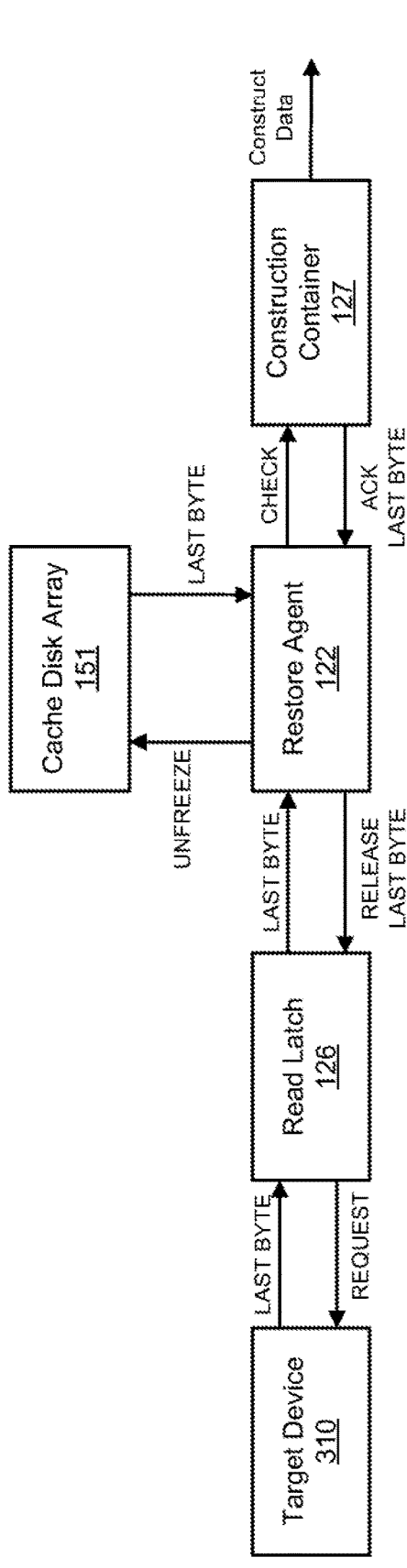

Referring to FIG. 3E, when the next restore is triggered, cache disk array 151 may initially be queried for the captured footprints (or remaining footprints as some of the captured footprints may have been flushed), and the last data chunk that was successfully pushed to container 127 may be identified based on the footprints. From the marginal footprints captured in cache disk array 151, all of the information regarding the last data set that was read may be retrieved by the restore agent 122. Also, the restore agent 122 may perform a health check of the container data in container 127 to ensure the available data is healthy and sufficient to reconstruct. If the recent data chunks (e.g., bytes) during the abort are not healthy to be reconstructed, then the read latch 126 may be indicated or commanded to re-query those data chunks as the starting point. Otherwise, the last data chunk information (e.g., footprints) from cache disk array 151 may be used to restart the restore as an uninterrupted one. The restore agent 122 may now retrieve the data set that was to be read from the point where it was aborted. Accordingly, a start or 'release' signal to the read latch 126 may be provided. An 'unfreeze' signal may also be communicated to cache disk array 151 to start the data tracking.

Figure 3F:
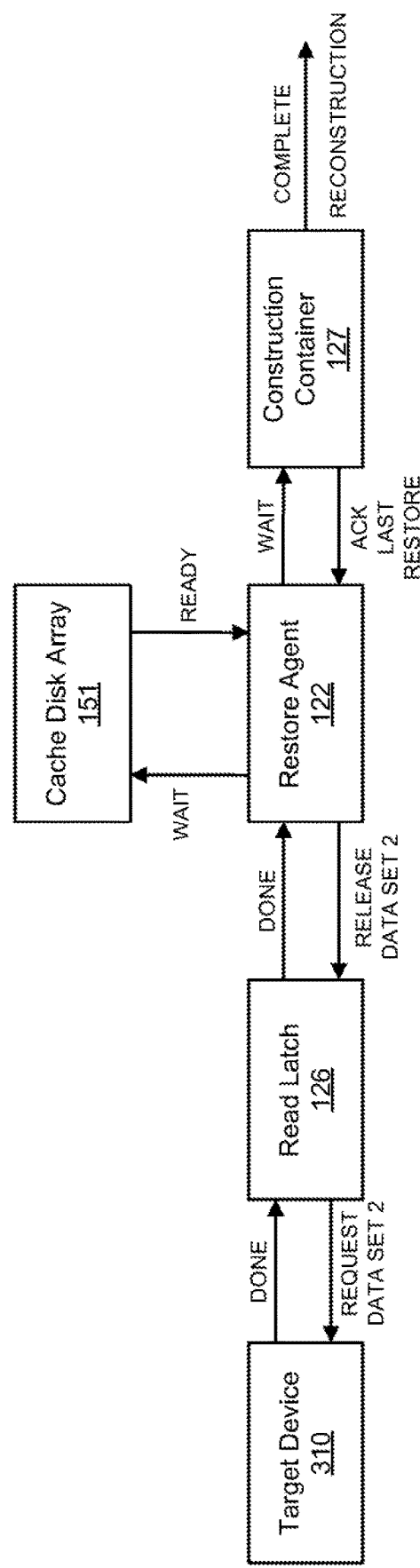

Referring to FIG. 3F, once the restore is completed, then the next data set may be retrieved by restore agent 122 with a 'release' signal to read latch 126.

Figure 4:
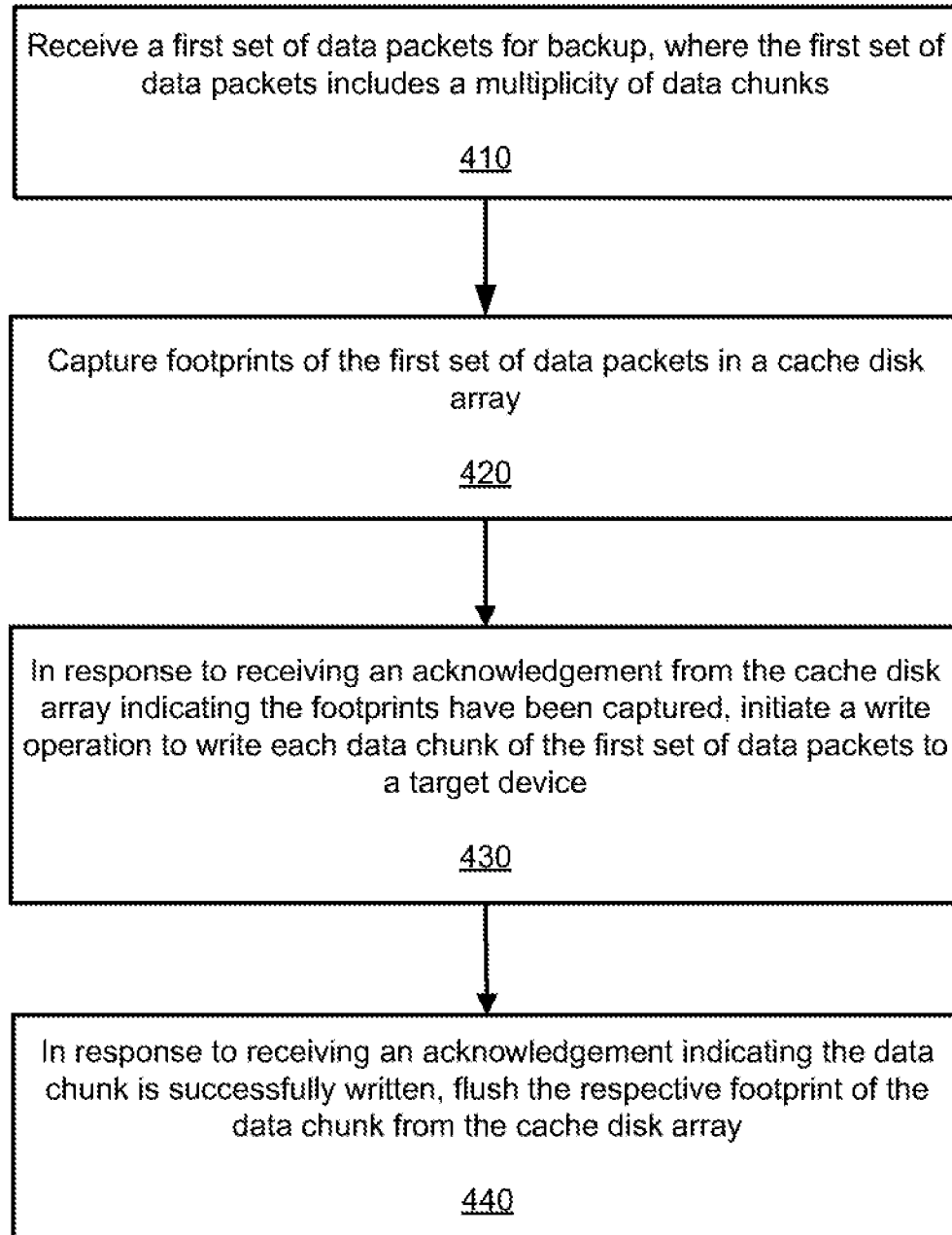
FIG. 4 is a flow diagram illustrating a method for backing up data to a target device according to one embodiment.

FIG. 4 is a flow diagram illustrating a method for backing up data to a target device according to one embodiment. Process 400 may be performed by processing logic that includes hardware (e.g. circuitry, dedicated logic, etc.), software (e.g., embodied on a non-transitory computer readable medium), or a combination thereof. For example, process 400 may be performed by backup agent 121 and/or write latch 125 of FIG. 1.

Referring to FIG. 4, at block 410, the processing logic receives a first set of data packets for backup, where the first set of data packets includes a multiplicity of data chunks. At block 420, the processing logic captures footprints of the first set of data packets in a cache disk array (e.g., cache disk array 151 of FIG. 1). At block 430, in response to receiving an acknowledgement from the cache disk array indicating the footprints have been captured, the processing logic initiates a write operation to write each data chunk of the first set of data packets to a target device (e.g., storage units 108-109). At block 440, in response to receiving an acknowledgement indicating the data chunk is successfully written, the processing logic flushes the respective footprint of the data chunk from the cache disk array.

Figure 5:
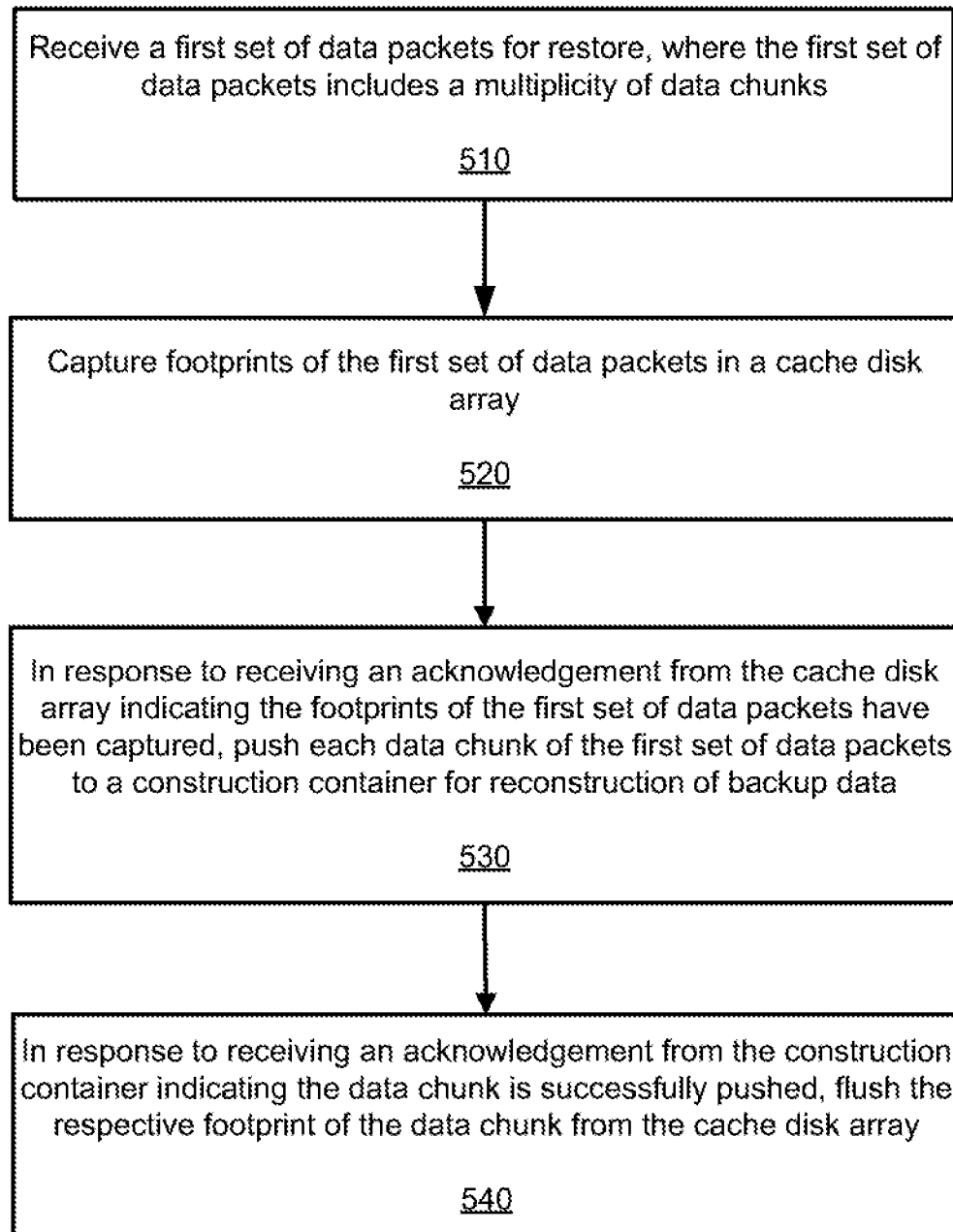
FIG. 5 is a flow diagram illustrating a method for restoring data from a target device according to one embodiment.

FIG. 5 is a flow diagram illustrating a method for restoring data from a target device according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by restore agent 122, read latch 126, and/or construction container 127 of FIG. 1.

Referring to FIG. 5, at block 510, the processing logic receives a first set of data packets for restore, where the first set of data packets includes a multiplicity of data chunks. At block 520, the processing logic captures footprints of the first set of data packets in a cache disk array. At block 530, in response to receiving an acknowledgement from the cache disk array indicating the footprints of the first set of data packets have been captured, the processing logic pushes each data chunk of the first set of data packets to a construction container for reconstruction of backup data. At block 540, in response to receiving an acknowledgement from the construction container indicating the data chunk is successfully pushed, the processing logic flushes the respective footprint of the data chunk from the cache disk array.

Note that some or all of the components as shown and described above (e.g., backup agent 121, restore agent 122, write latch 125, read latch 126, construction container 127 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
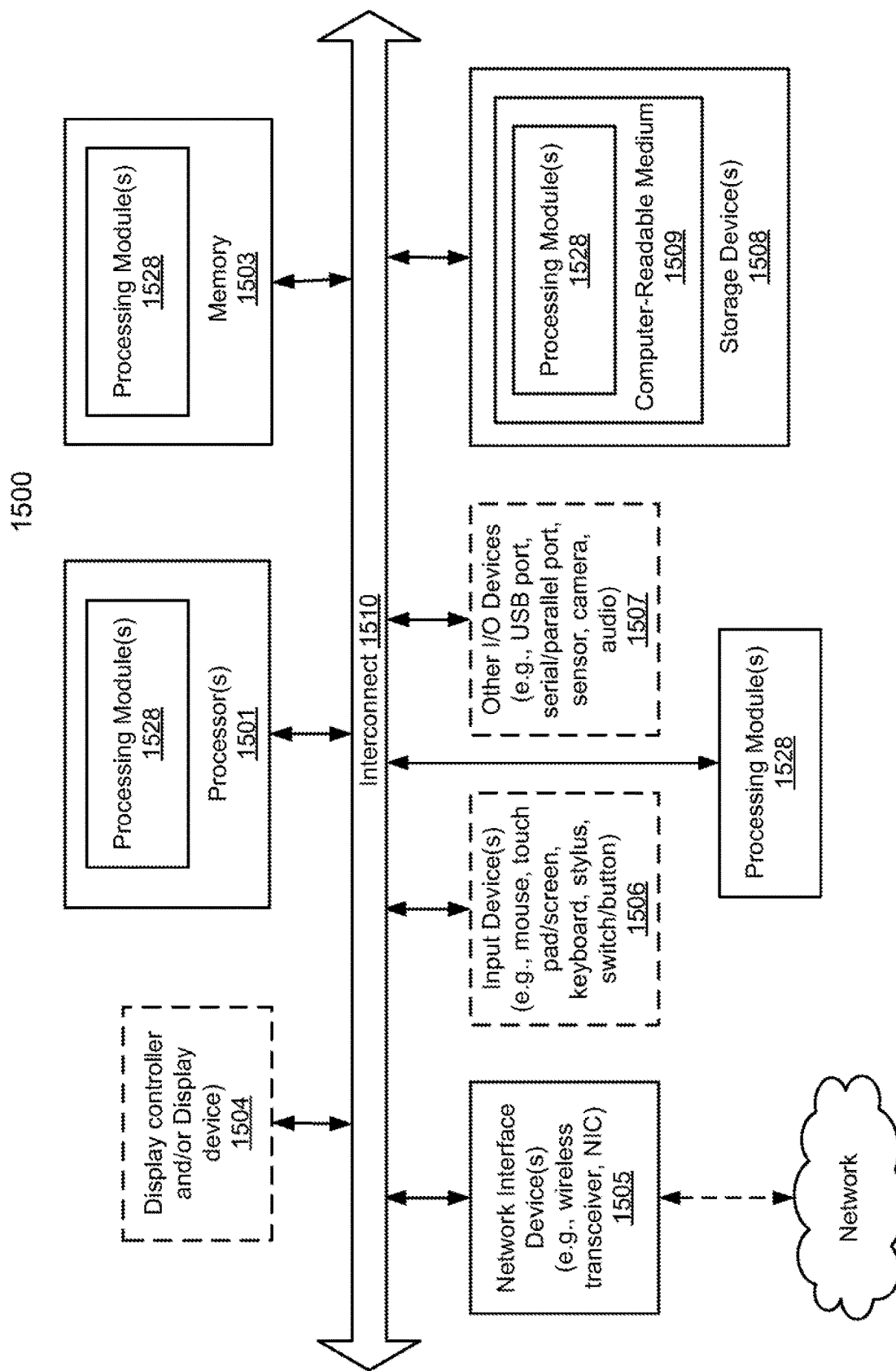
FIG. 6 is a block diagram illustrating a data processing system according to one embodiment.

FIG. 6 is a block diagram illustrating an example of a data processing system which may be used with one embodiment. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC).

The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 121-127 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for backing up data to a target device, comprising:
   receiving a first set of data packets for backup, wherein the first set of data packets comprises a plurality of data chunks;
   capturing footprints of the first set of data packets in a cache disk array installed on a client device;
   in response to receiving an acknowledgement from the cache disk array indicating the footprints have been captured,
      initiating a write operation to write each data chunk of the first set of data packets to the target device, and
      in response to receiving an acknowledgement indicating the data chunk is successfully written, flushing the respective footprint of the data chunk from the cache disk array; and
   in response to receiving an unexpected abort signal, communicating a freeze signal to the cache disk array to freeze the cache disk array at a point in time where a last data chunk was successfully written to the target device.

2. The method of claim 1, wherein the cache disk array is used as a reference for the last data chunk that was successfully written to the target device.

3. The method of claim 1, further comprising: in response to receiving a trigger for a next backup,
   querying remaining footprints of the first set of data packets from the cache disk array, and
   identifying the last data chunk that was successfully written based on the queried footprints.

4. The method of claim 3, further comprising: in response to receiving the trigger for the next backup, initiating a subsequent write operation to write the identified last data chunk to the target device, and unfreezing the cache disk array.

5. The method of claim 4, further comprising: when the backup of the first set of data packets is complete, retrieving a second set of data packets, and capturing footprints of the second set of data packets in the cache disk array.

6. The method of claim 1, wherein initiating the write operation to write each data chunk of the first set of data packets to the target device comprises communicating a wait signal to a write latch.

7. The method of claim 1, wherein the footprints of the first set of data packets include last byte information, logical address on a storage, sector information, and packet metadata information.

8. The method of claim 1, further comprising: holding a second set of data packets while writing each data chunk of the first set of data packets to the target device.

9. A non-transitory machine-readable medium having instructions stored therein, which when executed by a processor, cause the processor to perform operations, the operations comprising:
   receiving a first set of data packets for backup, wherein the first set of data packets comprises a plurality of data chunks;
   capturing footprints of the first set of data packets in a cache disk array installed on a client device;
   in response to receiving an acknowledgement from the cache disk array indicating the footprints have been captured,
      initiating a write operation to write each data chunk of the first set of data packets to a target device, and
      in response to receiving an acknowledgement indicating the data chunk is successfully written, flushing the respective footprint of the data chunk from the cache disk array; and
   in response to receiving an unexpected abort signal, communicating a freeze signal to the cache disk array to freeze the cache disk array at a point in time where a last data chunk was successfully written to the target device.

10. The non-transitory machine-readable medium of claim 9, wherein the cache disk array is used as a reference for the last data chunk that was successfully written to the target device.

11. The non-transitory machine-readable medium of claim 9, wherein the operations further comprise: in response to receiving a trigger for a next backup,
    querying remaining footprints of the first set of data packets from the cache disk array, and
    identifying the last data chunk that was successfully written based on the queried footprints.

12. The non-transitory machine-readable medium of claim 11, wherein the operations further comprise: in response to receiving the trigger for the next backup, initiating a subsequent write operation to write the identified last data chunk to the target device, and unfreezing the cache disk array.

13. The non-transitory machine-readable medium of claim 12, wherein the operations further comprise: when the backup of the first set of data packets is complete, retrieving a second set of data packets, and capturing footprints of the second set of data packets in the cache disk array.

14. The non-transitory machine-readable medium of claim 9, wherein initiating the write operation to write each data chunk of the first set of data packets to the target device comprises communicating a wait signal to a write latch.

15. The non-transitory machine-readable medium of claim 9, wherein the footprints of the first set of data packets include last byte information, logical address on a storage, sector information, and packet metadata information.

16. The non-transitory machine-readable medium of claim 9, wherein the operations further comprise: holding a second set of data packets while writing each data chunk of the first set of data packets to the target device.

17. A data processing system, comprising:
a processor; and
a memory coupled to the processor to store instructions, which when executed by the processor, cause the processor to perform operations, the operations comprising:
  receiving a first set of data packets for backup, wherein the first set of data packets comprises a plurality of data chunks;
  capturing footprints of the first set of data packets in a cache disk array installed on a client device;
  in response to receiving an acknowledgement from the cache disk array indicating the footprints have been captured,
    initiating a write operation to write each data chunk of the first set of data packets to a target device, and
    in response to receiving an acknowledgement indicating the data chunk is successfully written, flushing the respective footprint of the data chunk from the cache disk array; and
  in response to receiving an unexpected abort signal, communicating a freeze signal to the cache disk array to freeze the cache disk array at a point in time where a last data chunk was successfully written to the target device.

18. The data processing system of claim 17, wherein the cache disk array is used as a reference for the last data chunk that was successfully written to the target device.

19. The data processing system of claim 17, wherein the operations further comprise: in response to receiving a trigger for a next backup,
  querying remaining footprints of the first set of data packets from the cache disk array, and
  identifying the last data chunk that was successfully written based on the queried footprints.

20. The data processing system of claim 19, wherein the operations further comprise: in response to receiving the trigger for the next backup, initiating a subsequent write operation to write the identified last data chunk to the target device, and unfreezing the cache disk array.

21. The data processing system of claim 20, wherein the operations further comprise: when the backup of the first set of data packets is complete, retrieving a second set of data packets, and capturing footprints of the second set of data packets in the cache disk array.

22. The data processing system of claim 17, wherein initiating the write operation to write each data chunk of the first set of data packets to the target device comprises communicating a wait signal to a write latch.

23. The data processing system of claim 17, wherein the footprints of the first set of data packets include last byte information, logical address on a storage, sector information, and packet metadata information.

24. The data processing system of claim 17, wherein the operations further comprise: holding a second set of data packets while writing each data chunk of the first set of data packets to the target device.

* * * * *